US010859355B2

(12) United States Patent
Milburn

(10) Patent No.: US 10,859,355 B2
(45) Date of Patent: Dec. 8, 2020

(54) BALLISTIC INTERNET OF THINGS SENSORS AND COMMUNICATIONS PLATFORM

(71) Applicant: Booz Allen Hamilton Inc., McLean, VA (US)

(72) Inventor: Devereaux Milburn, McLean, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/558,924

(22) Filed: Sep. 3, 2019

(65) Prior Publication Data

US 2020/0072585 A1 Mar. 5, 2020

Related U.S. Application Data

(60) Provisional application No. 62/726,817, filed on Sep. 4, 2018.

(51) Int. Cl.
| | | |
|---|---|---|
| *F42B 10/00* | (2006.01) | |
| *H04W 4/38* | (2018.01) | |
| *H04L 29/08* | (2006.01) | |

(52) U.S. Cl.
CPC .............. *F42B 10/00* (2013.01); *H04L 67/12* (2013.01); *H04W 4/38* (2018.02)

(58) Field of Classification Search
CPC ........ F42B 10/00; F42B 12/382; H04W 4/38; H04W 80/00; H04W 4/70; H04W 4/027; H04L 67/12; H04L 69/18
See application file for complete search history.

(56) References Cited

U.S. PATENT DOCUMENTS

| | | | | |
|---|---|---|---|---|
| 7,624,399 | B2 * | 11/2009 | Pfeifer .................... | G06F 9/546 709/218 |
| 2017/0097216 | A1 * | 4/2017 | Sullivan .................. | F42B 10/32 |
| 2017/0284772 | A1 * | 10/2017 | Beckman .............. | F41G 3/2644 |

* cited by examiner

*Primary Examiner* — Michael A Keller
(74) *Attorney, Agent, or Firm* — Buchanan Ingersoll & Rooney PC

(57) ABSTRACT

A projectile device for establishing a wireless network and transmitting data within the network. The projectile device includes a motion sensor configured to measure at least one of an acceleration, angular velocity, or an orientation of the projectile device; an antenna configured for communication within a wireless network between the projectile device and at least one external device. The projectile device includes a processor configured to establish communication in the wireless network for receiving and/or transmitting a message between the projectile device and the at least one external device via the antenna and a wireless protocol that is determined by at least one of the acceleration, angular velocity, or orientation of the projectile device. The projectile device includes a damping agent arranged to impact movement of components of the projectile device, wherein a form factor of the projectile device is complimentary with a launching mechanism of the projectile device.

15 Claims, 5 Drawing Sheets

BALLISTIC INTERNET OF THINGS SENSORS AND COMMUNICATIONS PLATFORM

FIELD

Aspects of the present disclosure relate generally to devices and methods for ballistic internet of things sensors and communications platform.

BACKGROUND INFORMATION

The Internet of Things (IoT) is a network of physical devices, vehicles, home appliances, and other items embedded with electronics, software, sensors, actuators, and connectivity which enable these things to connect and exchange data, creating opportunities for more direct integration of the physical world into computer-based systems, resulting in efficiency improvements, economic benefits, and reduced human exertions.

IoT involves extending Internet connectivity beyond standard devices, such as desktops, laptops, smartphones and tablets, to any range of traditionally non-internet-enabled physical devices and everyday objects. Embedded with technology, these devices can communicate and interact over the Internet, and they can be remotely monitored and controlled.

Edge computing is a method of optimizing applications or cloud computing systems by taking some portion of an application, its data, or services away from one or more central nodes (the "core") to the other logical extreme (the "edge") of the Internet which makes contact with the physical world or end users.

Known techniques that use sensors on projectile devices do not fully utilize the benefits offered by using IoT and edge computing. These known techniques involve sensors wed to the hardware of the movable object. This leads to the flight time driven by expensive installation requirements of sensors on projectile devices. The present disclosure provides solutions to overcome the aforementioned challenges.

SUMMARY

A projectile device for establishing a wireless network and transmitting data within the network is disclosed. The projectile device can include a motion sensor configured to measure at least one of an acceleration, angular velocity, or an orientation of the projectile device; an antenna configured for communication within a wireless network between the projectile device and at least one external device; a processor configured to establish communication in the wireless network for receiving and/or transmitting a message between the projectile device and the at least one external device via the antenna and a wireless protocol that is determined by at least one of the acceleration, angular velocity, or orientation of the projectile device, wherein the processor is configured to determine at least one of a first portion of the message to be transmitted from the projectile device to the external device, or a second portion of the message to be stored in a memory associated with the processor; and a damping fluid arranged to impact movement of one or more components of the projectile device, wherein a form factor of the projectile device is configured to be complementary with a launching mechanism of the projectile device.

A method for transmitting data within a wireless network established between a projectile device and at least one external device is disclosed. The method can include launching the projectile device using a launching mechanism; measuring via a motion sensor at least one of an acceleration, angular velocity, or an orientation of the projectile device; establishing a wireless network between the projectile device and the at least one external device using an antenna; communicating in the wireless network by receiving and/or transmitting a message between the projectile device and the at least one external device via the antenna and a wireless protocol that is determined by at least one of the acceleration, angular velocity, or orientation of the projectile device; determining at least one of a first portion of the message to be transmitted from the projectile device to the at least one external device, or a second portion of the message to be stored in a memory associated with the processor; and arranging a damping agent in the projectile device to impact movement of one or more components of the projectile device, wherein the projectile device has a form factor configured to be complementary with a launching mechanism of the projectile device.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Figure 1:
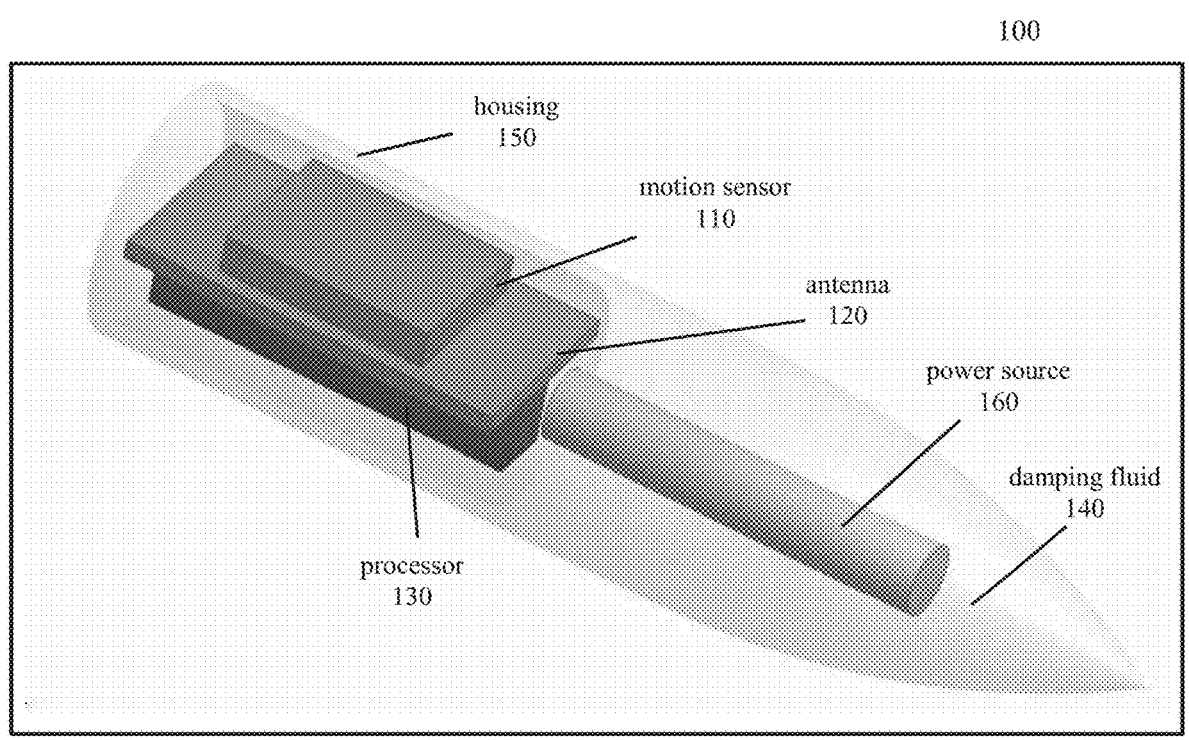
FIG. 1 illustrates a projectile device according to an exemplary embodiment.
Figure 2:
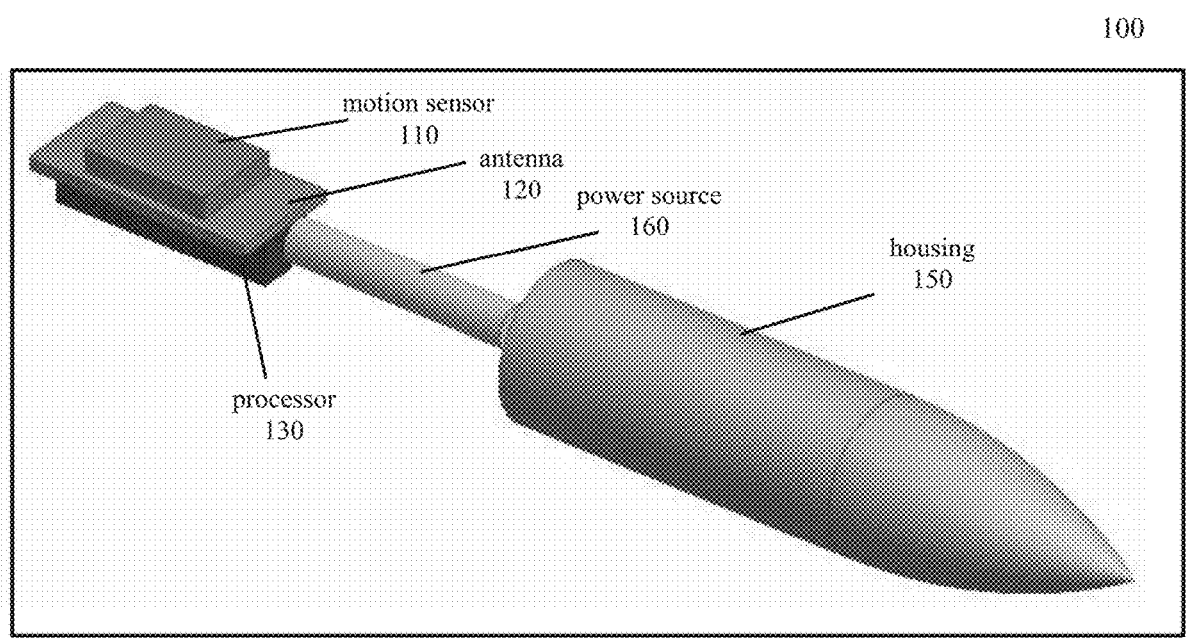
FIG. 2 illustrates an exploded view of a projectile device according to an exemplary embodiment.

FIG. 1 illustrates an exemplary projectile device 100 for establishing a wireless network and transmitting data within the network. The projectile device includes at least motion sensors 110, antenna 120, processor 130, damping agent (fluid) 140, housing 150, and power source 160. Each of these components, described in detail herein, is shown in FIG. 2 that is an exploded view of FIG. 1.

The projectile device 100 can be any object (e.g., a bullet) with a form factor that is complementary with the mechanism for launching the projectile device 100 into space (empty or not) by the exertion of a force. For example, a ranged weapon, which is any gun that can shoot targets, can be a launching mechanism for launching a bullet as the projectile device.

The wireless network established by the projectile device 100 can be a computer network that uses wireless data connections between network nodes. The wireless network can be a wireless ad hoc network or a mobile ad hoc network that is a decentralized type of wireless network. Such a network need not rely on a pre-existing infrastructure, such as routers in wired networks or access points in managed (infrastructure) wireless networks.

In an exemplary embodiment, each node of the wireless network can participate in routing by forwarding data for other nodes, so the determination of which nodes forward data can be made dynamically on the basis of network connectivity and the routing algorithm in use. The wireless network can be self-configuring, dynamic networks in which nodes are free to move. The wireless network can allow network nodes to create and join networks "on the fly"—anywhere, anytime.

In an exemplary embodiment, the projectile device 100 can include one or more motion sensors 110 configured to measure at least one of an acceleration, angular velocity, or an orientation of the projectile device 100. The motion sensors 110 can include a gyroscope for measuring or maintaining orientation and angular velocity. The gyroscope can be, for example, a vibrating structure gyroscope that uses a vibrating structure to determine the rate of rotation, or a microelectromechanical systems (MEMS) gyroscope based on Foucault pendulum. Of course, other types of gyroscopes and motion sensors can be used for measurement.

In an exemplary embodiment, the motion sensors 110 can include an accelerometer to measure acceleration of the projectile device 100. The accelerometer can be, for example, a thermal or convective accelerometer that contains a heater at the bottom of a dome, which heats the air/fluid inside the dome, producing a thermal bubble that acts as the proof mass. In such an accelerometer, an accompanying temperature sensor (like thermistor; or thermopile) in the dome can determine the temperature profile inside the dome, hence, providing the location of the heated bubble within the dome. Due to any applied acceleration, a physical displacement of the thermal bubble occurs, and it gets deflected off its center position within the dome. By measuring this displacement, the acceleration applied to the sensor can be measured. Due to the absence of solid proof mass, thermal accelerometers can yield high shock survival ratings.

In an exemplary embodiment, the projectile device 100 can include at least one antenna 120 configured for communication within the wireless network between the projectile device 100 and one or more external devices (not shown). The antenna 120 can be configured for transmitting and/or receiving radio waves propagating through space. In transmission, an exemplary radio transmitter can supply electric current to antenna terminals, and the antenna 120 can radiate the energy as electromagnetic waves (e.g., radio frequency waves). In reception, the antenna 120 can intercept some of the power of an electromagnetic wave to produce an electric current at its terminals, which can be applied to a receiver to be amplified. The external devices can be projectile devices and can be configured similar to the projectile device 100, or configured using other form factors.

In an exemplary embodiment, the antenna 120 can be an array of conductors (elements) electrically connected to the receiver or transmitter. During transmission an oscillating current can for example be applied to the antenna 120 by a transmitter to create an oscillating electric field and magnetic field around the antenna elements. These time-varying fields can radiate energy away from the antenna into space as a moving transverse electromagnetic field wave. Conversely, during reception, the oscillating electric and magnetic fields of an incoming radio wave can exert force on the electrons in the antenna elements, causing them to move back and forth, creating oscillating currents in the antenna 120. The antenna 120 can be a whip antenna.

In an exemplary embodiment, the antenna 120 can, for example, be designed to transmit and receive electromagnetic waves (e.g., radio frequency waves) in all horizontal directions equally (omnidirectional antennas), or in a particular direction (directional or high gain antennas). The antenna 120 can include parasitic elements, parabolic reflectors or horns, which serve to direct the radio waves into a beam or other desired radiation pattern.

In an exemplary embodiment, the projectile device 100 can include a processor 130 configured to establish communication in the wireless network for receiving and/or transmitting a message between the projectile device 100 and the external devices via the antenna 120 and a wireless protocol that is determined by at least one of the acceleration, angular velocity, or orientation of the projectile device 100.

The wireless protocol defines the standards that allow the multiple devices to exchange information through the airwaves. The wireless protocol can be a frequency that can provide considerably reduced power consumption and cost, while maintaining a similar communication range, or any other suitable protocol that is or is not an industry standard.

For example, if the angular velocity of the projectile device 100 exceeds a particular threshold (e.g., 250,000 revolutions per minute) then the Link 16 communications standard can be used as the wireless protocol, such as in the case of a rifle that launches a projectile device (a bullet) with an angular velocity of 252,000 revolutions per minute (exceeding the 250 k rpm threshold) when it leaves the barrel. In such a case, the wireless protocol can be Wi-Fi. Alternately, if the angular velocity of the bullet is 150,000 revolutions per minute (below the 250 k rpm threshold), the wireless protocol can be High Frequency (HF): 3-30 MHz.

Similarly, in various exemplary embodiments, if the acceleration of the projectile device 100 and angular velocity are lower than respective pre-defined threshold levels, then Ultra HF: 300-3,000 MHz can be used as the wireless protocol. Similarly, other alternatives using any one or any combination of two or all three of the acceleration, angular velocity, or orientation of the projectile device can determine the wireless protocol. The threshold levels of any of the acceleration, angular velocity, or orientation can be pre-defined or calculated on the fly.

In an exemplary embodiment, the wireless protocol can also be based on a form factor of the projectile device 100 and at least one of the acceleration, angular velocity, or orientation. For example, for a Speer bullet with a total diameter of about 0.510 in (13.0 mm), neck diameter of about 0.560 in (14.2 mm), shoulder diameter of about 0.735 in (18.7 mm), base diameter of about 0.804 in (20.4 mm), rim diameter of about 0.804 in (20.4 mm), rim thickness of about 0.083 in (2.1 mm), case length of about 3.91 in (99 mm), and overall length of about 5.45 in (138 mm), mass of about 42 gm, and velocity of about 928 m/s, the wireless protocol can be Link 16. However, for the same dimensions but a different mass (about 45 gm), velocity (about 908 m/s), and type (Barnes bullet), the wireless protocol can be Very High Frequency (VHF): 30-300 MHz.

Non-limiting examples of wireless protocols based on acceleration, angular velocity, orientation, or form factor can include:

Link 16 which is a TDMA-based secure, jam-resistant, high-speed digital data link which operates in the radio frequency band 960-1,215 MHz;

High Frequency (HF) protocol: 3-30 MHz, when the projectile device operates beyond line-of-site;

VHF: 30-300 MHz for line-of-site regional communications;

UHF: 300-3,000 MHz: for satellite and regional line-of-site communications; and

Ku band: 12-18 GHz, for modern satellite communications.

In an exemplary embodiment, the processor 130 can be configured to determine at least one of a first portion of a message to be transmitted from the projectile device 100 to the external devices, or a second portion of the message to be stored in a memory associated with the processor 130.

The processor 130 can include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices can be integrated onto a single substrate (e.g., silicon "die"), or distributed among two or more substrates.

Various functional aspects of the processor 130 can be implemented solely as software or firmware associated with the processor 130. The processor 130 can be a central processing unit (CPU) within a computer that carries out the instructions of a computer program by performing the basic arithmetic, logical, control and input/output (I/O) operations specified by the instructions.

The processor 130 can be a microprocessor that incorporates the functions of a central processing unit on a single integrated circuit (IC), or at most a few integrated circuits. The microprocessor is a multipurpose, clock driven, register-based, digital-integrated circuit that accepts binary data as input, processes it according to instructions stored in its memory, and provides results as output. The microprocessor can contain both combinational logic and sequential digital logic. The microprocessor can operate on numbers and symbols represented in the binary numeral system.

In an exemplary embodiment, the processor 130 can have an operational voltage of about 1.8V/3.3V, and a maximum current draw of about 300 mA. The processor 130 can, for example, be an Intel Quark SE microcontroller or other substitute processor. The Intel Quark SE microcontroller can be part of the Intel Curie Module that further includes a six-axis accelerometer/gyroscope, a pattern matching accelerator, Bluetooth Low energy, an optional battery charger, 1.8V/3.3V LDO.

The processor 130 can analyze the message by using Internet of Things (IoT) distributed computing (e.g., edge computing) to determine the first portion to be transmitted from the projectile device 100 to the external devices, and/or the second portion of the message to be stored in a memory associated with the processor 130.

The projectile device 100 and the external devices can form a distributed system which communicate and coordinate their actions by passing messages to one another. Such a distributed system can leverage computing power of the various connected devices and the components in these devices forming an IOT network with distributed processing capabilities, which can allow vast quantities of data in multiple configurations to be processed quickly. The various devices of such distributed system can receive data from the various sensors, and analytics and knowledge generation can be performed at the edge of the devices (edge computing). This can allow the communications bandwidth between devices to carry fewer messages, and, consequently, the storage and processing capacity of associated central data centers can be reduced.

In an exemplary embodiment, the first portion of the message can include location information (e.g., time varying geo-coordinate information) of the projectile device 100. In this case, the location information can be stored in the memory to provide reconnaissance information of an area where the projectile device 100 is launched.

As another example, the second portion of the message can include terrain characteristics of the area where the projectile device 100 is launched. The terrain characteristics can be obtained by, for example, using a camera mounted on the projectile device 100. The images or videography obtained by the camera would require large storage space in the memory; therefore, they can be transmitted to an external device without being permanently stored in the memory associated with the processor 130.

In an exemplary embodiment, a user of the projectile device 100 can select portions (first portion) of the message that have to be transmitted to an external device (a first portion) and that have to be stored in the memory (a second portion). Alternately, the selection of various portions of the message can be predetermined.

The memory can include volatile and nonvolatile, removable and non-removable media implemented in any method or technology for storage of information such as computer readable instructions, data structures, program modules or other data. The memory can include, but is not limited to, RAM, ROM, EEPROM, flash memory, or any other medium which can be used to store the desired information and which can accessed by the device. Any such memory may be part of or used in conjunction with the processor 130.

The projectile device 100 can include a damping agent 140 arranged to impact movement of one or more components of the projectile device 100, wherein a form factor of the projectile device 100 is configured to be complimentary with a launching mechanism of the projectile device 100.

In an exemplary embodiment, the damping agent (fluid) 140 can occupy the remaining internal volume of a housing 150 the projectile device 100 that is not being used by any of the aforementioned components. The damping agent 140 can be selected based on its effect on the weight of the projectile device 100. For example, a higher weight can provide increased stability of the projectile device 100 by providing an even distribution of weight when in rotational flight. The damping agent 140 can be selected to increase durability of the projectile device 100 by providing an internal cushioning mechanism when it hits/lands on a surface.

The damping agent 140 can be a fluid of type of oil such as a high viscosity silicone damping fluid that ranges in viscosities from about 5,000 cSt (centistokes) to about 200,000 cSt at 25° C. The damping fluid can engender a viscous damping force that is a formulation of the damping phenomena, in which the source of damping force can be modeled as a function of the volume, shape, and velocity of an object traversing through a real fluid with viscosity.

Figure 3:
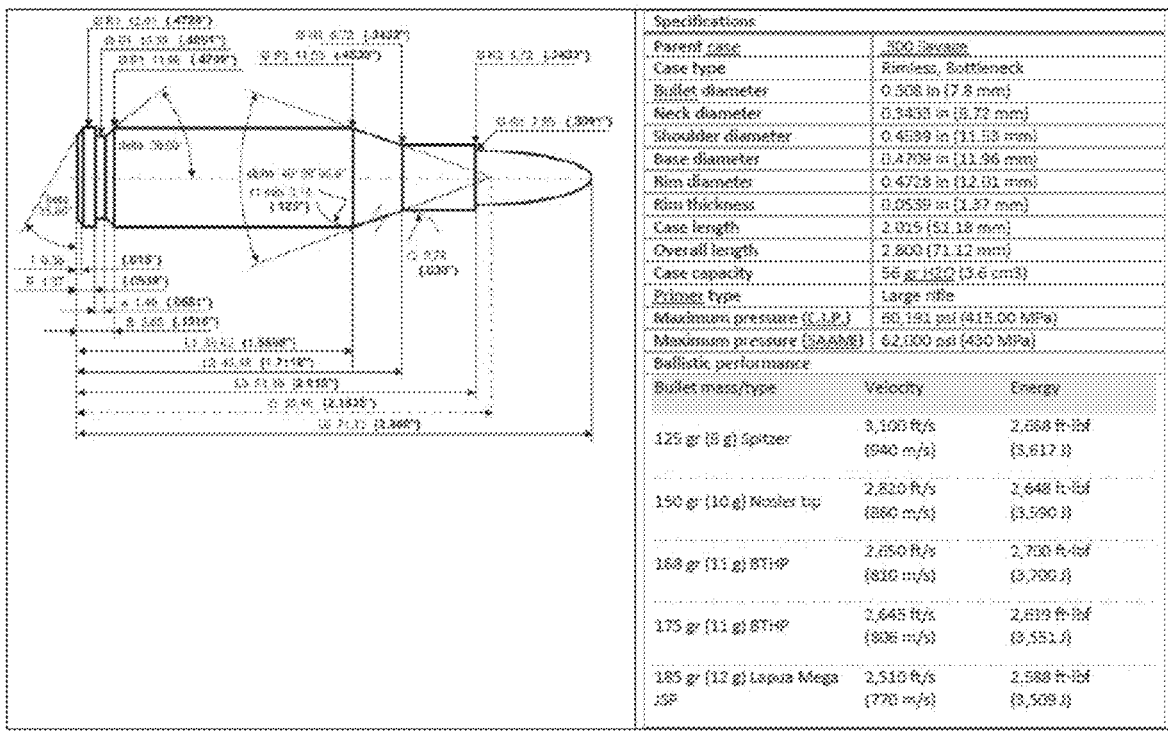
FIG. 3 illustrates exemplary detailed specifications of a projectile device according to an exemplary embodiment.
Figure 4:
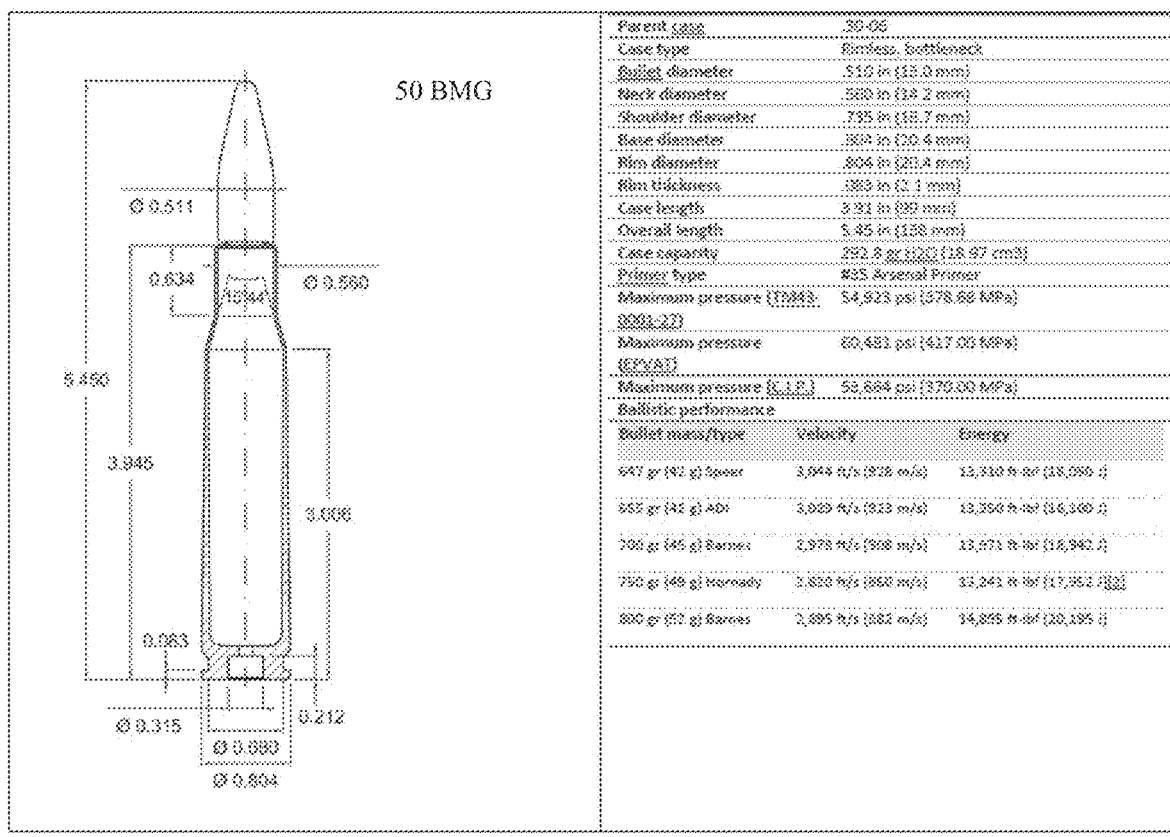
FIG. 4 illustrates detailed specification of a projectile device according to another exemplary embodiment.

FIG. 3 and FIG. 4 illustrate exemplary embodiments of a projectile device 100 showing different dimensions of various portions of the housing 150, which can be made of a variety of materials such as copper, lead, steel, polymer, rubber and wax. The form factor of the projectile device 100 can be based on the material it's made from.

In an exemplary embodiment, the projectile device 100 can include a power source 160 configured to power to the processor when it receives and/or transmits the message. The power source 160 can be a Pin-type Li-ion battery, a solar power source, or a radio frequency (RF) power source, or any combination of these. The power source 160 can be a Panasonic CG-320A battery. The power source 160 can have maximum dimensions of about 3.65 mm diameter×20 mm in length, a maximum nominal voltage of about 3.8V, a maximum capacity of about 15 mAh, and an operating temperature between about −20 degree Celsius and about 60 degree Celsius. The power source 160 can have a running time in an approximate range of between about 6 and 24 hours.

The projectile device 100 in combination with a launching mechanism can provide a system for establishing a network according to the present disclosure, wherein the launching mechanism can for example be a weapon system such as a rifle, bazooka, or a missile launcher. The launching mechanism can be a launch vehicle, launch pad, vehicle assembly, and other related infrastructure. Part of the weapons system can be a device or coordinated set of devices or objects that includes one or more weapons and/or a means of delivery and/or integral equipment and materiel. The launching mechanism can also be included with an aircraft or a projectile can be weapon system that can conduct surveillance.

The projectile device 100 can be any device configured with a form factor that is complementary to a select launching mechanism. For example, the form factor of the projectile device can be that of a bullet that can be expelled from a gun barrel during shooting. The bullet can be made of a variety of materials such as copper, lead, steel, polymer, rubber, metal, alloy, wax, or any combination of the above. The bullet can be available either singly as in muzzle loading and cap and ball firearms or as a component of paper cartridges. The bullet can be made in a large number of shapes and constructions which depend on the intended applications. The bullet can be disposable and single-use, or recoverable and reusable. The bullet can have a ruggedized hardware with a stabilizing gel/non-Newtonian fluid, or a standard copper FMJ to both disguise hardware and serve as the antenna. The bullet can have battery trip activation on fire.

The bullet can have an application-based cartridge. The bullet can have a 30-caliber cartridge for long range solutions, 12-gauge shell for medium range solutions, and 40 mm grenade for heavier loads. Each type of bullet and associated system can come with a variety of different solutions to meet both offensive and defensive requirements.

In various exemplary embodiments, the projectile device 100 can be used to collect, process, and remit data in various applications. The projectile device 100 can be used to relay, transmit, receive, spoof, interfere with, and hack radio communications. The projectile device 100 can be used for tracking, visual recon, digital tracing, and positioning, and be used in battlefield IR and geodetic grids. The projectile device 100 can be used in data to decision campaigns, communicating and networking in denied environments, GPS spoofing, or GPS spoofing denial. The projectile device 100 can be used in a natural disaster recovery by launching the device into fallen debris and collapsed buildings, or by shooting into hurricanes for distributed sensor nets, or oil and gas discovery. The projectile device 100 can be used in computer vision, Blockchain for managing nodes, and autonomous communications via radio frequencies.

Figure 5:
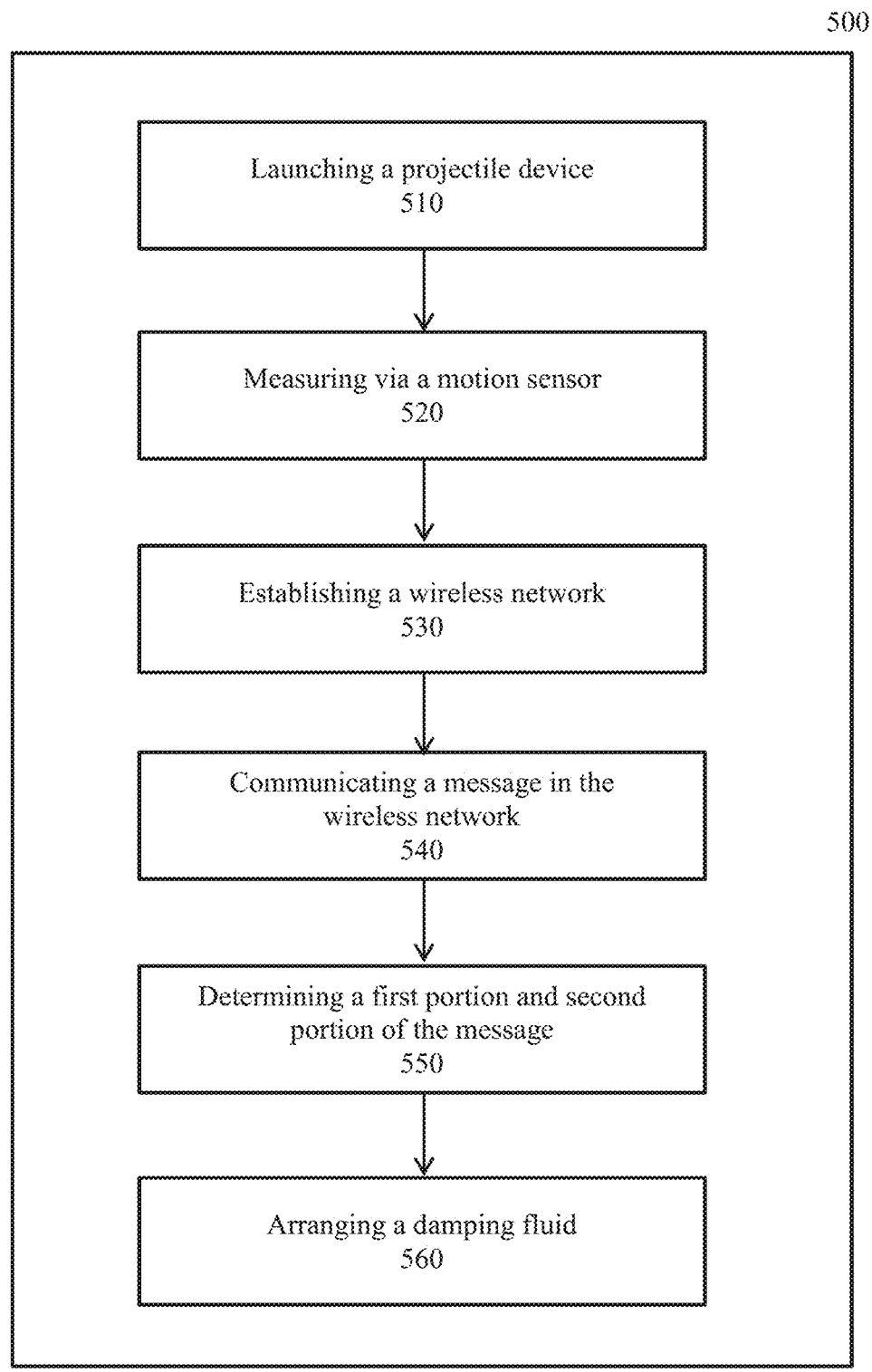
FIG. 5 illustrates a flowchart for an exemplary method for establishing a wireless network with a projectile device and for transmitting data within the network.

FIG. 5 shows a flowchart for method 500 for transmitting data within a wireless network established between a projectile device and at least one external device. The method can include a step 510 launching the projectile device using a launching mechanism as previously described with respect to projectile device 100.

The method 500 can include a step 520 of measuring via a motion sensor at least one of an acceleration, angular velocity, or an orientation of the projectile device, and a step 530 of establishing a wireless network between the projectile device and the at least one external device using an antenna, as previously described in detail with respect to the projectile device 100 and the motion sensor 110.

The method 500 can include a step 540 of communicating in the wireless network by receiving and/or transmitting a message between the projectile device and the at least one external device via the antenna and a wireless protocol that is determined by at least one of the acceleration, angular velocity, orientation, or form factor of the projectile device, as previously described with respect to projectile device 100 and the antenna 120.

The method 500 can include a step 550 of determining at least one of a first portion of the message to be transmitted from the projectile device to the at least one external device, or a second portion of the message to be stored in a memory associated with the processor, as previously described with respect to projectile device 100 and the processor 130.

The method 500 can include a step 560 of arranging a damping agent in the projectile device to impact movement of one or more components of the projectile device, wherein the projectile device has a form factor configured to be complementary with a launching mechanism of the projectile device, as previously described with respect to projectile device 100 and the damping agent 140.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed processors can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although a set of operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A processor, as used herein, can be a special purpose or a general purpose processor device. The processor can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner.

In an embodiment, the memory and the one or more additional memories can be non-transitory computer readable recording media. Data stored in the exemplary computing device (e.g., in the memory) can be stored on any type of suitable computer readable media, such as a flash memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A projectile device for establishing a wireless network and transmitting data within the network, the projectile device comprising:
    a motion sensor configured to measure at least one of an acceleration, angular velocity, or an orientation of the projectile device;
    an antenna configured for communication within a wireless network between the projectile device and at least one external device;
    a processor configured to establish communication in the wireless network for receiving and/or transmitting a message between the projectile device and the at least one external device via the antenna and a wireless protocol that is determined by at least one of the acceleration, angular velocity, or orientation of the projectile device, wherein the processor is configured to determine at least one of a first portion of the message to be transmitted from the projectile device to the external device, or a second portion of the message to be stored in a memory associated with the processor; and
    a damping agent arranged to impact movement of one or more components of the projectile device, wherein a form factor of the projectile device is configured to be complementary with a launching mechanism of the projectile device.

2. The projectile device of claim 1 in combination with a launching mechanism, wherein the launching mechanism is a weapon system.

3. The projectile device of claim 1 is a bullet.

4. The projectile device of claim 1, wherein the wireless protocol is one of encrypted VHF frequency, UHF frequency, or Link 16 communications standard.

5. The projectile device of claim 1, comprising:
    a power source configured to power the processor when it receives and/or transmits the message.

6. The projectile device of claim 5, wherein the power source has maximum dimensions of 3.65 mm diameter×20 mm length, a maximum nominal voltage of 3.8V, a maximum capacity of 15 mAh, and an operating temperature between −20 degree Celsius and 60 degree Celsius.

7. The projectile device of claim 5, wherein the power source is at least one of a pin-type Lithium-Ion battery, a solar power source, or a radio frequency (RF) power source.

8. The projectile device of claim 5, wherein the power source has a running time in a range between 6 and 24 hours.

9. The projectile device of claim 1, wherein the processor has an operational voltage of 1.8V/3.3V, and a maximum current draw of 300 mA.

10. The projectile device of claim 1, wherein the processor is configured to perform pattern matching to identify at least one of the first portion or the second portion of the message.

11. The projectile device of claim 1, in combination with a housing, wherein a portion of the housing has a cylindrical shape with a maximum diameter of 13 mm.

12. The projectile device of claim 1, wherein the antenna is an antenna that is conformally integrated with the housing.

13. The projectile device of claim 1, wherein the damping agent is a damping fluid.

14. A method for transmitting data within a wireless network established between a projectile device and at least one external device, the method comprising:
    launching the projectile device using a launching mechanism;

measuring via a motion sensor at least one of an acceleration, angular velocity, or an orientation of the projectile device;

establishing a wireless network between the projectile device and the at least one external device using an antenna;

communicating in the wireless network by receiving and/or transmitting a message between the projectile device and the at least one external device via the antenna and a wireless protocol that is determined by at least one of the acceleration, angular velocity, or orientation of the projectile device;

determining at least one of a first portion of the message to be transmitted from the projectile device to the at least one external device, or a second portion of the message to be stored in a memory associated with the processor; and arranging a damping agent in the projectile device to impact movement of one or more components of the projectile device, wherein the projectile device has a form factor configured to be complementary with a launching mechanism of the projectile device.

15. The method of claim 14 in combination with a launching mechanism, wherein the launching mechanism is a weapon system.

* * * * *